United States Patent
Guo et al.

(10) Patent No.: US 10,210,647 B2
(45) Date of Patent: Feb. 19, 2019

(54) GENERATING A PERSONAL AVATAR AND MORPHING THE AVATAR IN TIME

(71) Applicant: International Business Machines Corporation, Armonk, NY (US)

(72) Inventors: Shang Q. Guo, Cortlandt Manor, NY (US); Jonathan Lenchner, North Salem, NY (US); Maharaj Mukherjee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 15/447,619

(22) Filed: Mar. 2, 2017

(65) Prior Publication Data
US 2018/0253882 A1    Sep. 6, 2018

(51) Int. Cl.
*G06T 13/40*    (2011.01)
*G06F 3/0484*    (2013.01)
*G06T 13/20*    (2011.01)

(52) U.S. Cl.
CPC .......... *G06T 13/40* (2013.01); *G06F 3/04845* (2013.01); *G06T 13/205* (2013.01)

(58) Field of Classification Search
CPC .... G06T 13/40; G06T 13/205; G06F 3/04845
See application file for complete search history.

(56) References Cited

U.S. PATENT DOCUMENTS

| | | | |
|---|---|---|---|
| 7,882,222 B2 | 2/2011 | Dolbier et al. | |
| 2001/0019330 A1* | 9/2001 | Bickmore | G06T 13/40 345/473 |
| 2003/0222891 A1* | 12/2003 | Okamoto | G06T 11/00 345/646 |
| 2004/0056857 A1* | 3/2004 | Zhang | G06K 9/00268 345/419 |

(Continued)

FOREIGN PATENT DOCUMENTS

WO    2015/154951 A1    11/2015

OTHER PUBLICATIONS

Lee et al., "Interactive Control of Avatars Animated with Human Motion Data", SIGGRAPH '02 Proceedings of the 29th annual conference on Computer graphics and interactive techniques, Jul. 23-26, 2002, pp. 491-500, San Antonio, Texas.

(Continued)

*Primary Examiner* — Tadesse Hailu
(74) *Attorney, Agent, or Firm* — Scully, Scott, Murphy & Presser, PC; Kurt P. Goudy, Esq.

(57) ABSTRACT

A virtual reality processor-based system and computer implemented method that morphs an individual's personal characteristics, including appearance, voice, speech behavior, movement behavior, physical agility and expressionable ideas, so that people can have a more realistic sensation as they move in the past and future. The personal avatar morphed to a time in the past is based on interpolating the personal characteristics information and the avatar morphed to a time in the future is based on extrapolating the personal (Continued)

characteristics information. The avatar morphed to a time in the past is restricted from speaking a response inconsistent with real-world events. In another embodiment, an option to change the scenarios whereby users can experience different changes of events is provided.

20 Claims, 3 Drawing Sheets

(56) References Cited

U.S. PATENT DOCUMENTS

| | | | | | |
|---|---|---|---|---|---|
| 2009/0044113 | A1* | 2/2009 | Jones | ............... | G06T 13/40 |
| | | | | | 715/707 |
| 2010/0007665 | A1* | 1/2010 | Smith | ............... | G06T 13/40 |
| | | | | | 345/473 |
| 2010/0077315 | A1* | 3/2010 | Fujioka | ............. | A63F 13/12 |
| | | | | | 715/747 |
| 2010/0169798 | A1* | 7/2010 | Hyndman | .......... | G06F 3/011 |
| | | | | | 715/757 |
| 2012/0154684 | A1* | 6/2012 | Luo | ............... | G11B 27/034 |
| | | | | | 348/700 |
| 2013/0257876 | A1 | 10/2013 | Davis | | |
| 2013/0257877 | A1* | 10/2013 | Davis | ............... | A63F 13/12 |
| | | | | | 345/473 |
| 2013/0325493 | A1* | 12/2013 | Wong | ............... | G06F 19/00 |
| | | | | | 705/2 |
| 2016/0005106 | A1* | 1/2016 | Giraldez | .......... | G06Q 30/0269 |
| | | | | | 705/14.73 |
| 2017/0031439 | A1 | 2/2017 | Connor et al. | | |
| 2017/0256086 | A1* | 9/2017 | Park | ............... | G06T 7/73 |
| 2017/0286824 | A1* | 10/2017 | Tormasov | ........ | G06Q 10/10 |

OTHER PUBLICATIONS

Arunkumar, Saritha; "Fully automatic method for robust age progression", IBM Emerging Technolgoeis Blog, Sep. 6, 2016, pp. 1-11, http://blog.ibmjstart.net/2016/09/06/fully-automatic-method-robust-age-progression.

Kumar, Pawan; "Process to Download Voice Changer for PC App (with effects)", Blue Stack Tutorial, Jul. 27, 2015, pp. 1-9, http://bluestackstutorial.com/2015/07/voice-changer-for-pc-app.

* cited by examiner

GENERATING A PERSONAL AVATAR AND MORPHING THE AVATAR IN TIME

BACKGROUND OF THE INVENTION

This disclosure is directed to computers, and computer applications, and more particularly to computer-implemented methods and systems for generating an avatar in a virtual reality (VR) environment and for morphing the avatar in time.

It is often difficult for people to visualize themselves in a future situation and understand their future needs. In addition, people sometimes like to relieve their memory at familiar places or places they have visited or see all family members at a particular time in the past. This may particularly be useful for people suffering dementia to boost their memory and quality of life.

In our life, there are often many moments we made important decisions. Sometimes, we really want to imagine what if we made a different decision, what will I be like today?

Using current virtual reality goggles in current VR systems people can move to a fixed location at some fixed time. However, current VR systems do not change the whole person in time, including appearances and abilities. Also the current VR computer systems are not capable of providing the ability to consider variations of events.

SUMMARY OF THE INVENTION

One embodiment of the present disclosure is directed to a computer implemented method for generating a personal avatar in a virtual reality environment and for morphing the avatar in time. In one embodiment, the method includes the steps of inputting, by a processor-based system, personal characteristics information relating to a human subject. The personal characteristics information may include audio/video recordings of the human subject, photographic images of the human subject, social media feeds of the human subject, physical abilities of the human subject and medical history of the human subject.

The method further includes determining, by the processor-based system, avatar personal characteristics from the personal characteristics information and storing the avatar personal characteristics in an avatar personal characteristics table. The avatar personal characteristics include, in one embodiment, one or more of appearance simulating the human subject, voice simulating the human subject, movement behavior that is characteristic of the human subject, speech behavior that is characteristic of the human subject, physical agility that is characteristic of the human subject and expressionable ideas that are characteristic of the human subject.

The method further includes inputting, by the processor-based system, information relating to a VR environment in which avatars interact and inputting, by the processor-based system, information relating to real-world events.

The method further includes generating, by the processor-based system to a user, an avatar of the human subject based on the avatar personal characteristics and presenting the avatar in the VR environment. The avatar of the human subject is configured for speaking with the determined voice and the determined speech behavior, appearing with the determined appearance, and moving with the determined movement behavior and physical agility.

The method further includes receiving, by the processor-based system, a first communication from the user, the communication requesting the avatar to appear in one of a time in the past and a time in the future and presenting, by the processor-based system, the avatar of the human subject morphed to the requested time in the past based on interpolating the personal characteristic information stored in the avatar personal characteristic table. In one embodiment, the avatar of the human subject is morphed to the requested time in the future based on extrapolating the personal characteristic information stored in the avatar personal characteristic table.

The method further includes receiving, by the processor-based system, a second communication from the user and formulating a response to the communication based on the determined expressionable ideas and the real-world events, and presenting, by the processor-based system to the user, the morphed avatar of the human subject speaking the response, with the avatar speaking with morphed voice and morphed speech behavior, appearing with morphed appearance, and moving with morphed movement behavior and morphed physical agility. In one embodiment, the avatar morphed to a time in the past being restricted from speaking a response inconsistent with the real-world events.

A system that includes one or more processors operable to perform one or more methods described herein also may be provided.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION OF PREFERRED EMBODIMENTS

In one embodiment, the present disclosure provides a VR hardware processor-based system and computer implemented method that morphs the individual's appearances, vocabulary, agility, expressionable ideas, so that people can have a more realistic sensation as they move in the past and future. In one embodiment, the virtual reality system and method is a totally immersive system using VR goggles, with audio input and output systems and a feedback mechanism for measuring people's physical gestures and facial expressions. The VR system and method can be further extended with ambient temperature control, a physical harness to control movements as well as haptic feedback such as humidity or air. In another embodiment, an option to change the scenarios whereby users can experience different changes of events is provided.

Figure 1:
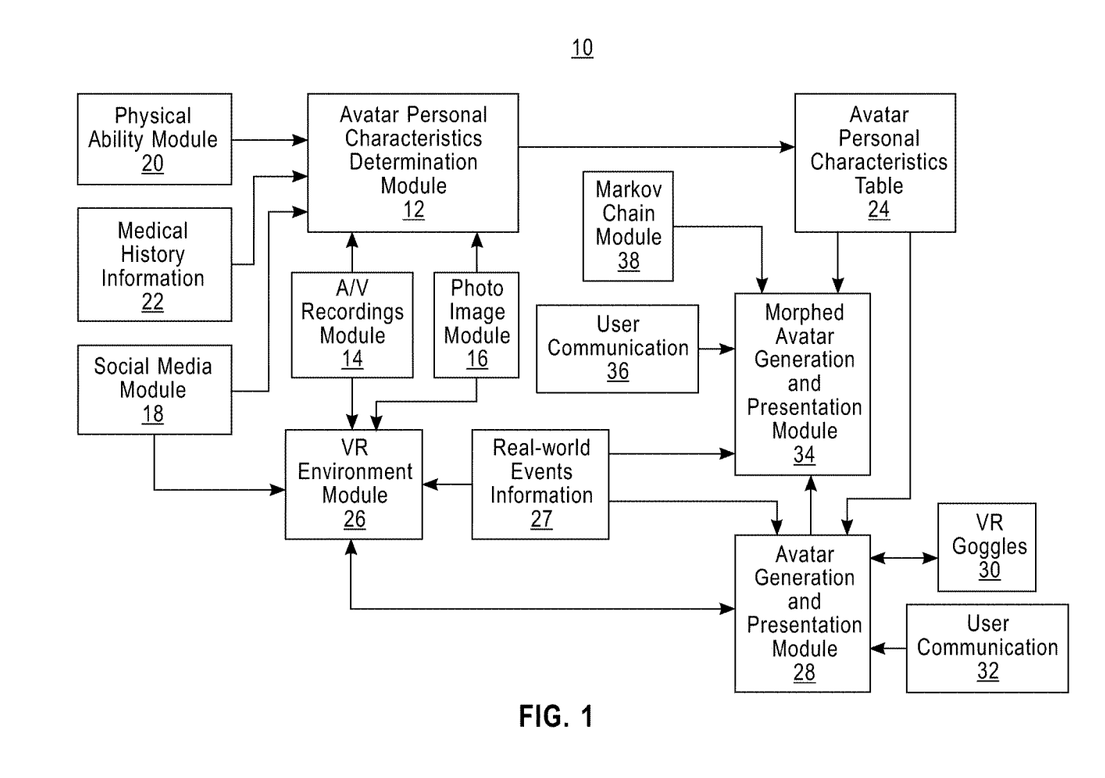
FIG. 1 is a block diagram of one embodiment of the system disclosed in this specification.
Figure 2:
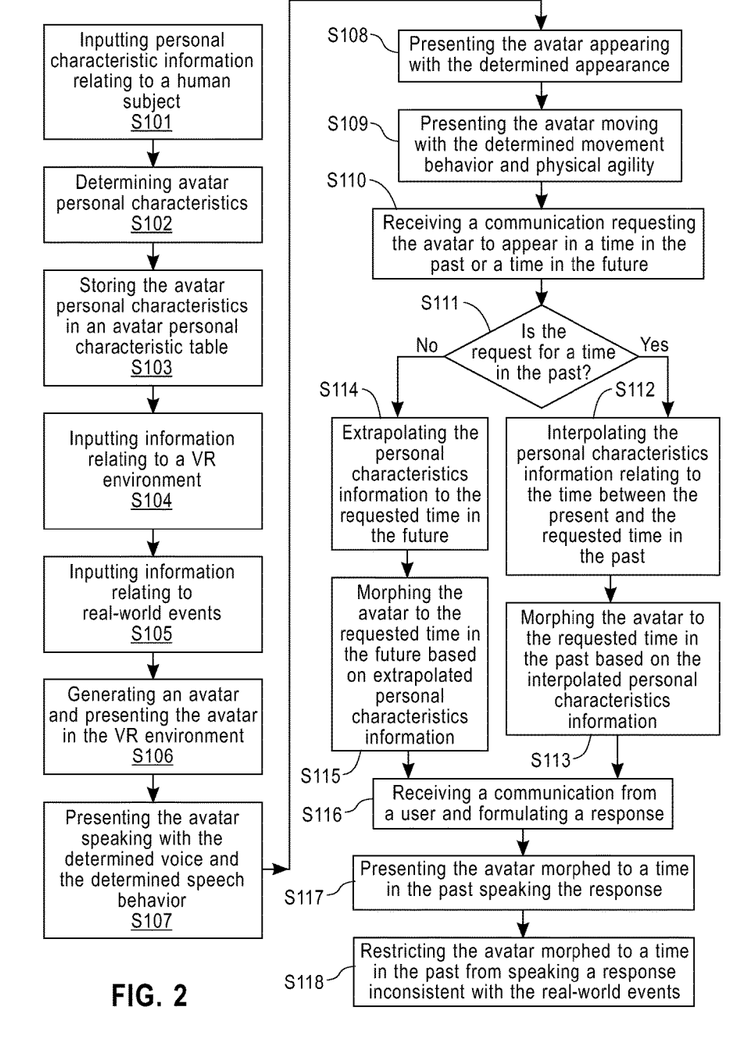
FIG. 2 is a flow diagram of one embodiment of the method disclosed in this specification.

FIG. 1 is a block diagram of a computer implemented system 10 for generating an avatar in a VR environment. FIG. 2 is a flow chart of a computer implemented method for generating an avatar in a VR environment. FIGS. 1 and 2 are described below.

The system 10 includes an avatar personal characteristics determination module 12. The method includes step S101 of inputting, by a processor-based system, personal characteristics information into module 12 relating to a human subject that distinguish the person as a unique individual, at a particular point in time, or particular points in time.

The personal characteristics information may include information obtained from audio/video recordings of the human subject input from module 14, photographic images of the human subject input from module 16 and social media feeds of the human subject input from module 18. The audio/video recordings and photographs may be input to the modules directly by the human subject or obtained from third persons or various other sources. These modules provide facial and physical appearance characteristics, including hand, eye, mouth and arm movements, stance, gait, gaze, mannerisms, hair color, skin color, glasses, typical clothing and hair style. These modules also provide voice and language characteristics, such as, sounds, pitch, tone, cadence, inflection, vocabulary, typical verbal responses and phrases. In addition, these modules provide expressionable ideas, such as philosophies, beliefs, preferences, goals, attitudes and traits.

The personal characteristics information may also include physical agility information obtained from physical ability module 20 and medical history 22. Physical ability module 20 obtains information from social media module 18 and other sources relating to the physical ability of the human subject. Medical history 22 is medical information, obtained only with the written permission of the human subject, from electronic medical records, insurance records and other sources approved by the human subject. These modules provide physical attributes, such as, height, weight, body type and build, health condition, exercise routines, participation in physical activities, injuries, medications and medical restrictions.

In one embodiment, the VR system uses known systems for inputting a person's movements based on movements of a wand and how fast and slow the person reacts based on their hand or physical gestures. The movement of a wand by the human subject can be in reaction to real world stimuli or VR stimuli. The agility is translated from these movements. Any physical constraints that a person might have acquired can also be taken into account. In a further embodiment, a harness can be provided to the person inputting the movements to restrict and/or control their movements based on the age, physical agility and mobility. The agility is then mapped based on the person's age.

In step S102, module 12 determines, by the processor-based system, from the personal characteristics information, avatar personal characteristics. The avatar personal characteristics include: appearance simulating the human subject, voice simulating the human subject, movement behavior that is characteristic of the human subject, speech behavior that is characteristic of the human subject, physical agility that is characteristic of the human subject, and expressionable ideas that are characteristic of the human subject. In step S103, module 12 stores the avatar personal characteristics in an avatar personal characteristics table 24.

In step S104, information relating to a VR environment in which avatars interact is input, by the processor-based system, to VR environment module 26. In one embodiment, the inputting information relating to the VR environment includes environment information obtained from the audio/video recordings of the human subject from module 14, photographic images of the human subject from module 16, and social media feeds of the human subject from module 18.

In step S105 information relating to real-world events 27 is input, by the processor-based system, to VR environment module 26. The environment avatars interact in will be changed based on available stored images of the environment. Further, the temperature and the breeze sensation may be changed based on the time of the year. Alternatively, a weather simulation jacket can be created that can more accurately provide temperature feedback based on the type of clothes the avatar is wearing at any particular moment.

In step S106, an avatar of the human subject is generated, by avatar generation and presentation module 28 of the processor-based system, based on the avatar personal characteristics from table 24. In step S107, the avatar of the human subject is presented, by module 28 of the processor-based system, to a user in the VR environment from module 26. The avatar of the human subject is presented in step S107 speaking with the determined voice and the determined speech behavior. In step S108 the avatar of the human subject is presented appearing with the determined appearance. In step S109 the avatar of the human subject is presented moving with the determined movement behavior and physical agility. The avatar is generated for presentation to the user wearing VR goggles 30.

In step S110, the avatar generation and presentation module 28 receives, by the processor-based system, a user communication 32 requesting the avatar to appear in one of a time in the past and a time in the future. In step S111 the processor-based system determines if the request is for presentation of the avatar in a time in the past.

If the request is for presentation of the avatar in a time in the past, step S111 YES, in step S112, the avatar generation and presentation module 28 interpolates, by the processor-based system, the personal characteristics information stored in the avatar personal characteristics table 24 relating to the time between the present and the requested time in the past. In step S113, the morphed avatar presentation module 34 morphs the avatar of the human subject to the requested time in the past based on the interpolated personal characteristics information. In one embodiment, the VR environment is morphed to the requested time in the past based on the audio/video recordings of the human subject from module 14, photographic images of the human subject from module 16, social media feeds of the human subject from module 18, relating to the requested time in the past.

If the request is for presentation of the avatar in a time in the future, step S111 NO, in step S114, the avatar generation and presentation module 28 extrapolates, by the processor-based system, the personal characteristics information stored in the avatar personal characteristics table 24 to the requested time in the future. In step S115, the morphed avatar presentation module 34 morphs the avatar of the human subject to the requested time in the future based on the extrapolated personal characteristics information.

In step S116, the morphed avatar generation and presentation module 34 receives a user communication 36 and formulates a response to the communication based on the determined expressionable ideas stored in the avatar personal characteristics table 24 and the real-world events information 27. In step S117, the morphed avatar of the human subject is presented speaking the response, with the avatar speaking with morphed voice and morphed speech behavior, appearing with morphed appearance, and moving with morphed movement behavior and morphed physical agility.

In step S118, the avatar morphed to a time in the past is restricted from speaking a response inconsistent with the real-world events. In one embodiment, vocabulary and ideas that the human subject may like to communicate through their avatar will be restricted based on their possible acquired vocabulary at any particular age. For example, a person would not be allowed to express thoughts about a person who is not born or events that had not happened yet in the past. If the morphed avatar generation and presentation module 34 determines such a discussion based on the key words, it alerts the speaker and mutes the avatar.

In one embodiment, the real-world events are changed based on a Markov chain and the avatar is morphed based on the changed real-world events. Markov chain module 38 uses a Markov chain model looking at any point in time and what are the most likely scenarios of any event happening. The user selects from the current point in time or at any point in the past. The user also has an option of changing an event to see how that impacts the avatar. The morphed avatar presentation module 34 then presents the avatar at the selected time in the past morphed based on the Markov chain model.

In one example, a user can use Markov chain module 38 see the likely impact of food and exercise on their physical appearances and agility over time and how that may impact their ability to interact with their environment. In another example, a user may use the Markov chain module 38 to experience a likely result for some of their purchase decisions, such as buying an expensive yet fragile show piece when a child is at home.

In another example, the Markov chain module 38 can be used to see how the user will likely fit in to a potential new house as the user grows older. The user can change the possible outcome based on different scenarios. For example, if one eats more and exercises less then perhaps they may develop an age related disease that might restrict their agility and mobility. The user may then decide that the huge home they are looking at may not be such a great idea after 20 years and instead buy a smaller home where they may fit in more properly over the time Alternatively, the user may consider buying the huge home but downsizing after a few years and in that case consider taking an ARM loan rather than a 30 year fixed interest rate to help them save some money. The method and system provides a simulated evolution of lifelike and faithful imaging entities.

Figure 3:
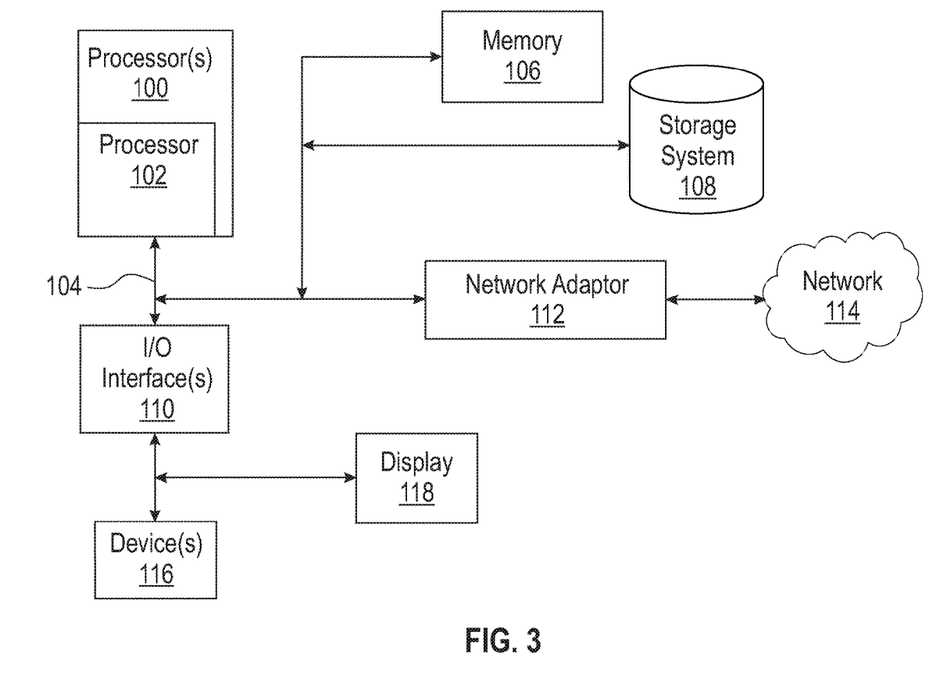
FIG. 3 is a block diagram of an exemplary computing system suitable for implementation of the embodiments of the invention disclosed in this specification.

FIG. 3 illustrates a schematic of an example computer or processing system that may implement the method for generating an avatar in a virtual reality (VR) environment in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods for generating an avatar in a virtual reality (VR) environment described herein. For example, module 102 may include at least modules 12, 24, 26, 28, 34 and 38 of FIG. 1 described above. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for generating a personal avatar in a virtual reality (VR) environment, comprising:
   inputting, by the processor-based system, personal characteristics information relating to a human subject, the personal characteristics information including audio/video recordings of the human subject, photographic images of the human subject, social media feeds of the human subject, physical abilities of the human subject and medical history of the human subject;
   determining, by the processor-based system, avatar personal characteristics from the personal characteristics information and storing the avatar personal characteristics in an avatar personal characteristics table;
   inputting, by the processor-based system, information relating to a VR environment in which avatars interact and information relating to real-world events;
   generating, by the processor-based system, an avatar of the human subject based on the avatar personal characteristics;
   presenting, by the processor-based system, the generated avatar of the human subject to the user in the VR environment, wherein the generated avatar of the human subject comprises the determined avatar personal characteristics;
   receiving, by the processor-based system, a first communication from the user, the communication requesting the avatar to appear in one of a time in the past and a time in the future;
   presenting, by the processor-based system, the avatar of the human subject morphed to the requested time in the past based on interpolating the personal characteristics information stored in the avatar personal characteristics table;
   formulating, by the processor-based system, a response to a received second communication, based on the determined expressionable ideas and the real-world events;
   presenting, by the processor-based system to the user, the morphed avatar of the human subject speaking the response, with the avatar speaking with morphed voice; and
   morphed speech behavior, appearing with morphed appearance, and moving with morphed movement behavior and morphed physical agility,
   wherein the avatar morphed to a time in the past being restricted from speaking a response inconsistent with the real-world events.

2. The computer implemented method of claim 1, wherein the avatar personal characteristics comprise one or more of: appearance simulating the human subject, voice simulating the human subject, movement behavior that is characteristic of the human subject, speech behavior that is characteristic of the human subject, physical agility that is characteristic of the human subject, and expressionable ideas that are characteristic of the human subject.

3. The computer implemented method of claim 1, further comprising presenting by the processor-based system the avatar of the human subject morphed to the requested time in the future based on extrapolating the personal characteristics information stored in the avatar personal characteristics table.

4. The computer implemented method of claim 3 wherein, the avatar morphed to a future time is based on the extrapolation of one or more of the physical abilities of the human subject, physical activity history of the human subject and medical history of the human subject.

5. The computer implemented method of claim 1, wherein the inputting of the physical abilities of the human subject is based on movement of a wand by the human subject in reaction to real world stimuli or VR stimuli.

6. The computer implemented method of claim 1, wherein the inputting information relating to the VR environment comprises environment information obtained from the audio/video recordings of the human subject, photographic images of the human subject, and social media feeds of the human subject.

7. The computer implemented method of claim 1, further comprising morphing the VR environment to the requested time in the past based on the audio/video recordings of the human subject, photographic images of the human subject, social media feeds of the human subject relating to the requested time in the past.

8. The computer implemented method of claim 1, further comprising changing the real-world events based on a Markov chain and morphing the avatar based on the changed real-world events.

9. A computer processor-based system for generating a personal avatar in a virtual reality (VR) environment, comprising:
   one or more computer processors;
   one or more non-transitory computer-readable storage media;
   program instructions, stored on the one or more non-transitory computer-readable storage media, which when implemented by the one or more processors, cause the computer system to perform the steps of:
   inputting, by the processor-based system, personal characteristics information relating to a human subject, the personal characteristics information including audio/video recordings of the human subject, photographic images of the human subject, social media feeds of the human subject, physical abilities of the human subject and medical history of the human subject;

determining, by the processor-based system, avatar personal characteristics from the personal characteristics information and storing the avatar personal characteristics in an avatar personal characteristics table;

inputting, by the processor-based system, information relating to a VR environment in which avatars interact and information relating to real-world events;

generating, by the processor-based system, an avatar of the human subject based on the avatar personal characteristics;

presenting, by the processor-based system, the generated avatar of the human subject to the user in the VR environment, wherein the generated avatar of the human subject comprises the determined avatar personal characteristics;

receiving, by the processor-based system, a first communication from the user, the communication requesting the avatar to appear in one of a time in the past and a time in the future;

presenting, by the processor-based system, the avatar of the human subject morphed to the requested time in the past based on interpolating the personal characteristics information stored in the avatar personal characteristics table;

formulating, by the processor-based system, a response to a received second communication, based on the determined expressionable ideas and the real-world events;

presenting, by the processor-based system to the user, the morphed avatar of the human subject speaking the response, with the avatar speaking with morphed voice, and morphed speech behavior, appearing with morphed appearance, and moving with morphed movement behavior and morphed physical agility, wherein the avatar morphed to a time in the past being restricted from speaking a response inconsistent with the real-world events.

10. The computer processor-based system of claim 9, wherein the avatar personal characteristics comprise one or more of: appearance simulating the human subject, voice simulating the human subject, movement behavior that is characteristic of the human subject, speech behavior that is characteristic of the human subject, physical agility that is characteristic of the human subject, and expressionable ideas that are characteristic of the human subject.

11. The computer processor-based system of claim 9, further comprising presenting by the processor-based system the avatar of the human subject morphed to the requested time in the future based on extrapolating the personal characteristics information stored in the avatar personal characteristics table.

12. The computer processor-based system of claim 11, wherein the avatar morphed to a future time is based on the extrapolation of one or more of the physical abilities of the human subject, physical activity history of the human subject and medical history of the human subject.

13. The computer processor-based system of claim 9, wherein the inputting of the physical abilities of the human subject is based on movement of a wand by the human subject in reaction to real world stimuli or VR stimuli.

14. The computer processor-based system of claim 9, wherein the inputting information relating to the VR environment comprises environment information obtained from the audio/video recordings of the human subject, photographic images of the human subject, and social media feeds of the human subject.

15. The computer processor-based system of claim 9, further comprising morphing the VR environment to the requested time in the past based on the audio/video recordings of the human subject, photographic images of the human subject, social media feeds of the human subject relating to the requested time in the past.

16. The computer processor-based system of claim 9 further comprising changing the real-world events based on a Markov chain and morphing the avatar based on the changed real-world events.

17. A computer program product comprising:
program instructions on a computer-readable storage medium, where execution of the program instructions using a computer causes the computer to perform a method for generating a personal avatar in a virtual reality (VR) environment, comprising:

inputting, by the processor-based system, personal characteristics information relating to a human subject, the personal characteristics information including audio/video recordings of the human subject, photographic images of the human subject, social media feeds of the human subject, physical abilities of the human subject and medical history of the human subject;

determining, by the processor-based system, avatar personal characteristics from the personal characteristics information and storing the avatar personal characteristics in an avatarpersonal characteristics table;

inputting, by the processor-based system, information relating to a VR environment in which avatars interact and information relating to real-world events;

generating, by the processor-based system, an avatar of the human subject based on the avatar personal characteristics;

presenting, by the processor-based system, the generated avatar of the human subject to the user in the VR environment, wherein the generated avatar of the human subject comprises the determined avatar personal characteristics, receiving, by the processor-based system, a first communication from the user, the communication requesting the avatar to appear in one of a time in the past and a time in the future;

presenting, by the processor-based system, the avatar of the human subject morphed to the requested time in the past based on interpolating the personal characteristics information stored in the avatarpersonal characteristics table;

formulating, by the processor-based system, a response to a received second communication, based on the determined expressionable ideas and the real-world events;

presenting, by the processor-based system to the user, the morphed avatar of the human subject speaking the response, with the avatar speaking with morphed voice, and morphed speech behavior, appearing with morphed appearance, and moving with morphed movement behavior and morphed physical agility, wherein the avatar morphed to a time in the past being restricted from speaking a response inconsistent with the real-world events.

18. The computer program product of claim 17, wherein the avatar personal characteristics comprise one or more of: appearance simulating the human subject, voice simulating the human subject, movement behavior that is characteristic of the human subject, speech behavior that is characteristic of the human subject, physical agility that is characteristic of the human subject, and expressionable ideas that are characteristic of the human subject.

19. The computer program product of claim 17, further comprising presenting by the processor-based system the avatar of the human subject morphed to the requested time in the future based on extrapolating the personal characteristics information stored in the avatar personal characteristics table.

20. The computer program product of claim 19, wherein the avatar morphed to a future time is based on the extrapolation of one or more of the physical abilities of the human subject, physical activity history of the human subject and medical history of the human subject.

\* \* \* \* \*